: 2,884,318
Patented Apr. 28, 1959

2,884,318

NITROGEN-PHOSPHORUS COMPOSITIONS

Curtis G. Christian, Anaheim, Calif., assignor, by mesne assignments, to Collier Carbon and Chemical Corporation, a corporation of California No Drawing. Application April 18, 1955
Serial No. 502,221

7 Claims. (Cl. 71—35)

This invention relates to a new composition of matter comprising the elements nitrogen and phosphorus, and to a method by which such compositions can be prepared.

A number of attempts have been made to prepare plant nutrient and other useful compositions containing maximum amounts of phosphorus and nitrogen by reacting phosphorus or phosphorus pentoxide with ammonia or mixtures of ammonia and oxygen. For the most part, however, the compositions so obtained were either hygroscopic, semi-pyrophoric, or noxious-smelling materials which were difficult to handle and unsatisfactory for most of their anticipated uses.

I have now found a means whereby there may be prepared a novel product which has an unusually high nitrogen and phosphorus content and is stable and non-hygroscopic. It is well adapted to use as a fertilizer and may also be employed as an intermediate in the preparation of new phosphorus- and nitrogen-containing acid derivatives such as salts and esters. It takes the form of a finely-divided tan-colored amorphous solid which melts with decomposition at about 440°–450° C., and has very limited solubility in water and in common organic solvents. It is acidic in nature, having a pK value of about 8.0, and is slowly hydrolyzed by boiling water and by strong acids or aqueous bases. A typical ultimate analysis is as follows:

|  | Percent |
| --- | --- |
| Total nitrogen | 19.0 |
| Total phosphorus | 30.0 |
| Hydrogen | 4.6 |
| Oxygen (by difference) | 46.4 |

While its chemical analysis, infrared spectrum, and other analytical characteristics indicate the product to be an amidophosphoric acid, its molecular structure has not been determined with any degree of certainty; accordingly it is herein described and claimed by means of its method of preparation rather than as a chemical compound whose identity can only be speculative.

The new product of the invention is obtained by reacting elemental phosphorus with carefully controlled amounts of oxygen and anhydrous ammonia at a temperatue below about 150° C. Conveniently, the initial reaction is carried out by heating yellow elemental phosphorus to a temperature slightly above its melting point, e.g., to 50°–60° C., and passing a gas mixture comprising ammonia and oxygen over the surface of the molten phosphorus while maintaining the environmental temperature below about 150° C., preferably between about 25° C. and about 120° C. The oxygen content of the gas mixture should not exceed about 5 percent by volume since the use of higher concentrations of oxygen results in the formation of semi-pyrophoric products. Preferably the gas mixture will contain between about 0.1–2.0 percent by volume of oxygen. The ammonia content should be at least about 5 percent by volume and may be as high as 99.5 percent by volume. However, control of the reaction temperature is facilitated if the ammonia content of the gas mixture is held below about 50 percent by volume and the remainder of the mixture is an inert gas such as nitrogen, argon, etc. A particularly suitable gas mixture consists of about 10–15 percent by volume of ammonia, about 1.0–1.5 percent by volume of oxygen, and about 83.5–89 percent by volume of nitrogen. Suitable control of the reaction temperature may conveniently be attained by controlling the temperature and/or the composition of the gas mixture. According to one method of operation the body of molten phosphorus is maintained at about 130° C. and the temperature of the gas mixture at its point of entry into the reaction zone is maintained at about 95° C. Since the reaction is preferably effected by contacting the reactants at the surface of a body of phosphorus, the latter most efficiently should take the form of a thin film or layer so that maximum surface is exposed to the gas mixture. When operating continuously, the phosphorus may be fed to the surface of a heated revolving drum mounted in an oven through which the gas mixture is passed, so that the phosphorus melts and forms a thin film on the surface of the drum and maximum surface is exposed to the gas stream. Alternatively, the molten phosphorus may be introduced into the reaction chamber as a fine mist from an atomizer employing an inert gas such as nitrogen as the propellant.

The product of the reaction is obtained as a copious evolution of near-white fumes from the surface of the phosphorus, and is carried out of the reaction zone by the gas stream. It may be separated from the gas stream by electrostatic precipitation or by means of a bag filter. In the solid state the color is tan rather than white as in the gas phase. While it is substantially insoluble in water it very readily disperses therein to form stable suspensions; accordingly when it is desired to produce the product in the form of an aqueous dispersion it may advantageously be separated from the gas stream by spray washing.

As will be apparent to those skilled in the art, various engineering and manipulative techniques may be applied in preparing the new product in a commercial scale. The process by which it is prepared may be carried out batch-wise, semi-continuously or continuously, and various methods of achieving the proper reaction temperature and control of the same may be employed. In essence, the invention consists in the process of reacting elemental phosphorus with a molecular deficiency of oxygen and a molecular excess of ammonia at a temperature below about 150° C., and thereafter cooling and collecting the product so formed, and in the novel product so obtained.

The following example will illustrate one way in which the principle of the invention has been applied, but is not to be construed as limiting the same:

Example

Small pieces of yellow phosphorus were placed in a spherical reaction chamber and a gas mixture consisting of 1.4 percent oxygen, 11.6 percent ammonia, and 87 percent nitrogen was introduced into the reaction chamber at diametrically opposite points at a rate of about 5.5 cu. ft./hr. The reaction chamber was externally heated to a temperature of about 110° C. The white fumes which were evolved from the surface of the phosphorus were swept out of the reaction chamber by the gas stream and directly into a bag filter attached to the outlet of the chamber. The product recovered from the bag filter was a very finely divided tan-colored solid having the analysis and properties previously stated.

In employing the new product as a fertilizer or plant nutrient, it may conveniently be applied to the soil and/or to plants in the form of an aqueous dispersion or suspension. The product is ordinarily obtained in such a fine state of subdivision that it forms relatively stable dispersions or suspensions in water without the aid of dispersing or suspending agents; however, such agents may be employed if desired. Since the product is exceptionally rich in nitrogen and phosphorus (corresponding to the fertilizer designation "19:67:0") it is effective in relatively small quantities, and dispersions of the same having excellent plant nutrient value may be relatively dilute, e.g., they may contain as little as 0.1–5 percent of the active ingredient. The new product may also be directly worked into the soil in solid form, as by harrowing or the like.

Other modes of applying the principle of my invention may be employed instead of those explained, change being made as regards the materials or methods employed provided the steps or product stated by any of the appended claims, or the equivalent of such stated steps or product, be employed as obtained. This application is a continuation-in-part of my copending application, Serial Number 484,567 filed January 27, 1955, which application describes and claims another new nitrogen-phosphorus product prepared by subjecting the product herein described to an elevated temperature for a short period of time.

I, therefore, particularly point out and distinctly claim as my invention:

1. The process which comprises contacting elemental phosphorus with a gas mixture comprising between about 0.1 and about 5 volume percent of oxygen and at least about 5 volume percent of anhydrous ammonia at a reaction temperature below about 150° C., said amount of oxygen being less than that sufficent to oxidize said elemental phosphorus to phosphorus pentoxide, whereby there is formed a substantially non-hygroscopic solid product containing about 19 percent by weight of nitrogen and about 30 percent by weight of phosphorus.

2. The process of claim 1 wherein the said gas mixture consists of between about 0.1 and about 5 volume percent of oxygen, between about 5 and about 50 volume percent of anhydrous ammonia, and the remainder being a gas which is non-reactive at the said temperature.

3. The process of claim 1 wherein the said gas mixture consists of between about 1.0 and about 1.5 volume percent of oxygen, between about 10 and about 15 volume percent of ammonia, and the remainder being nitrogen.

4. The process of claim 1 wherein the reaction temperature is maintained between about 25° and about 120° C.

5. As a new composition of matter the substantially non-hygroscopic solid product containing about 19% by weight of nitrogen and about 30% by weight of phosphorus obtained by contacting elemental phosphorus with a gas mixture comprising between about 0.1 and about 5 volume percent of oxygen, said amount being less than sufficient to oxidize said elemental phosphorus to phosphorus pentoxide, and at least about 5 volume percent of anhydrous ammonia at a reaction temperature below about 150° C.

6. A plant nutrient composition comprising an aqueous dispersion of the product defined by claim 5.

7. The method of fertilizing soil which comprises applying thereto an aqueous dispersion of the product defined by claim 5.

References Cited in the file of this patent

UNITED STATES PATENTS

| | | |
|---|---|---|
| 1,194,077 | Ross et al. | Aug. 8, 1916 |
| 2,122,122 | Woodstock | June 28, 1938 |
| 2,561,415 | Rice | July 24, 1951 |
| 2,689,780 | Rice | Sept. 21, 1954 |
| 2,713,536 | Driskell | July 19, 1955 |